(12) United States Patent
Kumagai et al.

(10) Patent No.: US 12,285,822 B2
(45) Date of Patent: Apr. 29, 2025

(54) INSPECTION SYSTEM FOR WELDED PORTION

(71) Applicant: TOYOTA JIDOSHA KABUSHIKI KAISHA, Toyota (JP)

(72) Inventors: Ryoji Kumagai, Toyota (JP); Yusuke Matsuoka, Nagoya (JP); Hisanori Kobayashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/124,264

(22) Filed: Mar. 21, 2023

(65) Prior Publication Data
US 2023/0405730 A1 Dec. 21, 2023

(30) Foreign Application Priority Data
May 25, 2022 (JP) .................. 2022-085055

(51) Int. Cl.
*B23K 31/12* (2006.01)
*G06T 1/00* (2006.01)
*G06T 7/00* (2017.01)

(52) U.S. Cl.
CPC .......... B23K 31/125 (2013.01); G06T 1/0007 (2013.01); G06T 7/0004 (2013.01); G06T 2207/20221 (2013.01)

(58) Field of Classification Search
CPC ............ B23K 31/125; B23K 2101/006; B23K 2101/18; B23K 9/16; B23K 11/11; B23K 26/21; G06T 1/0007; G06T 7/0004; G06T 2207/20221; G06T 7/001; G06T 7/60; G06T 7/70; G06T 2207/10004
See application file for complete search history.

(56) References Cited

U.S. PATENT DOCUMENTS

| | | | |
|---|---|---|---|
| 2013/0169677 A1* | 7/2013 | Rosset ................ | B42D 25/351 345/629 |
| 2021/0294929 A1* | 9/2021 | Kumazawa ............ | G06F 30/12 |
| 2022/0297241 A1* | 9/2022 | Okuma .................. | G01B 11/24 |
| 2022/0410313 A1* | 12/2022 | Kawahara .......... | G05B 19/4103 |
| 2023/0149741 A1* | 5/2023 | Hirai ........................ | G06T 7/33 378/4 |
| 2023/0230282 A1* | 7/2023 | Asano ...................... | G06T 7/80 348/187 |

FOREIGN PATENT DOCUMENTS

| | | | | |
|---|---|---|---|---|
| JP | 11-090643 A | | 4/1999 | |
| JP | H1190643 | * | 4/1999 | ............. G05B 19/18 |

(Continued)

*Primary Examiner* — Amara Abdi
(74) *Attorney, Agent, or Firm* — Sughrue Mion, PLLC (57) ABSTRACT

An inspection system for a welded portion in welding includes a display unit, an acquisition unit that acquires a reference position of a welded portion stored in the storage device, a display control unit that displays, on the display unit, a reference position image that is an image showing a reference position virtually superimposed on an image of an object to be welded in a real space captured by the imaging device and includes a welded portion, and a distance calculation unit that calculates a distance in the real space between the welded portion in the real space displayed on the display unit and the reference position of the welded portion.

5 Claims, 9 Drawing Sheets

(56) References Cited

FOREIGN PATENT DOCUMENTS

| JP | 2007-152371 A | | 6/2007 | |
|----|---------------|---|--------|---|
| JP | 2007152371 | * | 6/2007 | ............. B23K 11/24 |
| JP | 2009-172608 A | | 8/2009 | |
| JP | 2021-139771 A | | 9/2021 | |
| JP | 2021-149376 A | | 9/2021 | |
| JP | 2021139771 | * | 9/2021 | ............. G01N 21/88 |

* cited by examiner

INSPECTION SYSTEM FOR WELDED PORTION

CROSS-REFERENCE TO RELATED APPLICATION

This application claims priority to Japanese Patent Application No. 2022-085055 filed on May 25, 2022, incorporated herein by reference in its entirety.

BACKGROUND

1. Technical Field

The present disclosure relates to an inspection system for a welded portion.

2. Description of Related Art

In welding, various techniques used for inspection of welding quality have been proposed. For example, Japanese Unexamined Patent Application Publication No. 11-090643 (JP 11-090643 A) discloses a technique for displaying a welded portion determined to be poor welding on a 3D graphic of a welded object.

SUMMARY

However, when the poor welding is caused by the positional deviation of the welded portion, the deviation amount is measured manually by the inspector with reference to 2D design drawings. The 2D design drawings are shown in reduced size. Therefore, the inspector is required to have skills to determine the correspondence and direction between the design drawing and the actual welded object. Further, the inspection results are written on paper and stored. From the viewpoint of efficiency improvement and cost reduction, paperless recording of the inspection results is required. Therefore, there is a demand for a technique capable of easily inspecting a welded portion and storing an inspection result in a paperless manner.

The present disclosure can be realized in the following aspects.

(1) According to an aspect of the present disclosure, an inspection system for a welded portion is provided. The inspection system includes: a display unit; an acquisition unit that acquires a reference position of the welded portion stored in a storage device; a display control unit that causes the display unit to virtually superimpose a reference position image on a captured image to display the reference position image, the captured image being a captured image of a welded object in a real space captured by an imaging device, the captured image being a captured image including the welded portion, and the reference position image being an image indicating the reference position; and a distance calculation unit that calculates a distance in the real space between the welded portion in the real space displayed on the display unit and the reference position of the welded portion. According to the inspection system of this aspect, the reference position of the welded portion stored in the storage device is virtually superimposed on the captured image of the welded portion in the real space captured by the imaging device, as an image to be displayed. The distance calculation unit calculates the distance between the displayed welded portion and the reference position of the welded portion in the real space. This makes it easier to inspect the welded portion as compared with the case where the inspector manually measures the distance. The reference position image is superimposed and displayed on the captured image including the welded portion. This makes it possible to easily inspect the welded portion without depending on the skill of reading and interpreting the 2D design drawing.

(2) The inspection system according to the above aspect may further include a result storage unit that stores the distance calculated by the distance calculation unit.

According to the inspection system of this aspect, the result storage unit stores the distance calculated by the distance calculation unit. This makes it possible to store the calculated distance in a paperless manner.

(3) In the inspection system according to the above aspect, the display control unit may further cause the display unit to display a coordinate axis. The coordinate axis includes a first axis extending along a first direction and a second axis extending along a second direction perpendicular to the first direction.

According to the inspection system of this aspect, since the coordinate axes orthogonal to each other are displayed on the display unit, the inspector can confirm the direction of the welded object on the display unit.

(4) The inspection system according to the above aspect may further include a determination unit that determines whether welding of the welded portion in the real space is good using the distance calculated by the distance calculation unit. The determination unit may determine that the welding good when the distance is a distance within a predetermined threshold, and determine that the welding is poor when the distance is a distance that exceeds the predetermined threshold.

According to the inspection system of this aspect, the determination unit compares the distance calculated by the distance calculation unit with the predetermined threshold to determine whether the welding is good. This makes it easier to inspect the welding as compared with a case where the inspector manually determines whether the welding is good. In addition, it is possible to determine whether the welding is good in the inspection without being influenced by the inspection skill of the inspector.

(5) The inspection system according to the above aspect may further include a correction amount calculation unit that calculates a correction amount of a distance using the distance calculated by the distance calculation unit. The correction amount of the distance is an amount of a distance required for re-welding the welded portion in the real space at the reference position of the welded portion.

According to the inspection system of this aspect, the correction amount calculation unit calculates the correction amount of the distance necessary for re-welding at the reference position of the welded portion. This makes it easier to acquire the correction amount as compared with the case where the inspector calculates the correction amount.

(6) The inspection system according to the above aspect may further include a user interface that allows the reference position image displayed on the display unit to be moved on the captured image. When the reference position image is moved so as to overlap the welded portion in the captured image using the user interface, the distance calculation unit may calculate the distance using a movement amount of the reference position image.

According to the inspection system of this aspect, the reference position image on the captured image is moved so as to overlap the welded portion via the user interface, and the distance calculation unit calculates the distance by using the movement amount. Therefore, the inspector can easily calculate the distance while confirming the welded portion and the reference position of the welding.

The present disclosure can also be implemented in various forms other than an inspection system for a welded portion. For example, the present disclosure can be implemented in the form of an inspection method for a welded portion, a computer program for realizing an inspection method for a welded portion, a non-transitory recording medium in which the computer program is recorded, and the like.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A. First Embodiment

A1. System Configuration

Figure 1:
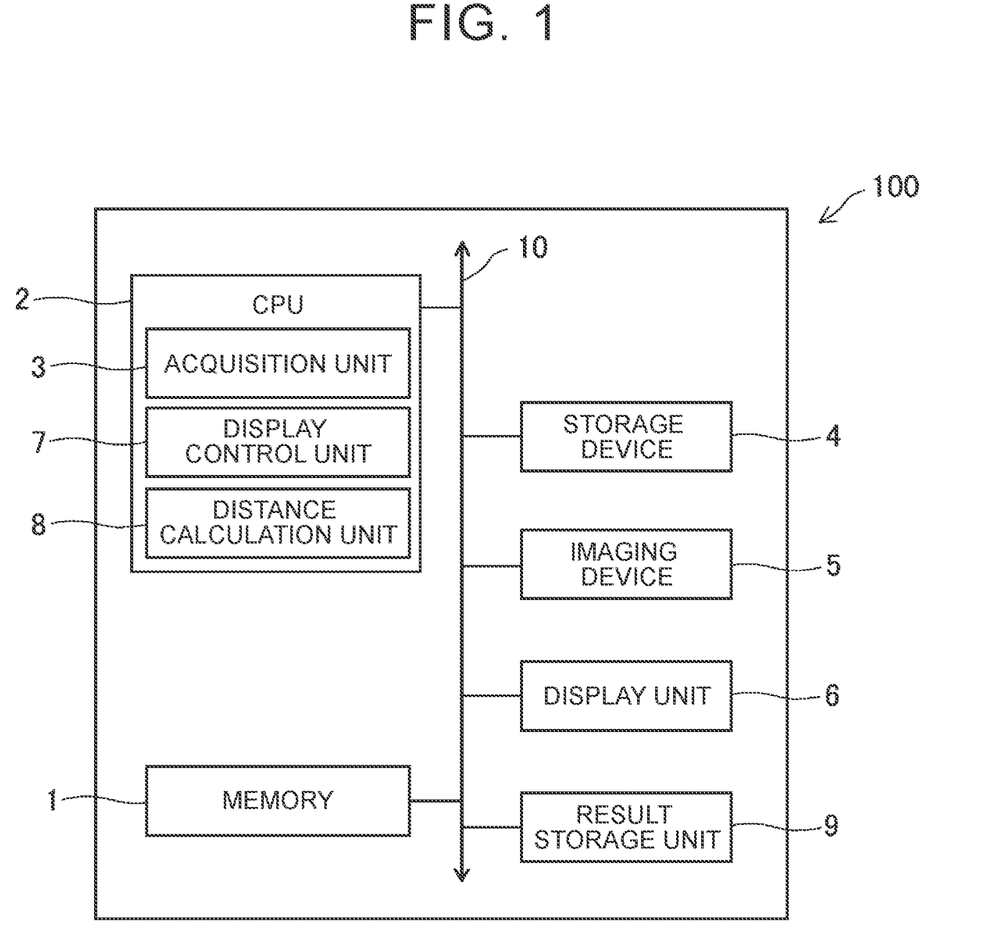
FIG. 1 is a block diagram schematically illustrating a welded portion inspection system according to an embodiment of the present disclosure.

FIG. 1 is a block diagram schematically illustrating a welded portion inspection system 100 according to an embodiment of the present disclosure. The inspection system 100 is used to inspect welding of a welded object. Inspection of the welding is performed after welding of the welded object. The inspection system 100 uses Augmented Reality (AR) techniques to virtually augment the real space. The inspection system 100 virtually superimposes and displays the welded portion defined in the design drawing on the image including the welded portion in the real space. In the post-welding inspection process, the inspector inspects the welding quality using the inspection system 100. In the inspection, the number and the position of the welded portion of the welded object are checked against the number and the position defined in the design drawing. In particular, when the position of the welded portion is deviated from the position defined in the design drawing, the inspection system 100 calculates the amount of deviation from the position defined in the design drawing. In the present embodiment, the welded object is a body of an automobile. The welding is, for example, resistance welding, arc welding, laser welding, or laser screw welding. The inspection system 100 includes an electronic device such as a tablet computer, a smartphone, or a head-mounted display. The inspection system 100 includes a memory 1, a CPU 2, a storage device 4, an imaging device 5, a display unit 6, and a result storage unit 9. The memory 1, CPU 2, the storage device 4, the imaging device 5, the display unit 6, and the result storage unit 9 can exchange data with each other via the internal bus 10.

The memory 1 includes, for example, a Dynamic Random Access Memory (DRAM, a flash memory, and the like, and stores a control program for operating the inspection system 100. The memory 1 is used as a temporary storage area for various data such as imaging data. Further, the memory 1 is also used as a work area when each unit of the inspection system 100 performs an operation. Central Processing Unit (CPU) 2 is a processor that controls the entire inspection system 100. CPU 2 reads and executes the control program from the memory 1. As a result, CPU 2 functions as the acquisition unit 3, the display control unit 7, and the distance calculation unit 8.

The acquisition unit 3 acquires the reference position of the welded portion stored in the storage device 4. The storage device 4 stores CAD data (also referred to as 3D CAD data) of the three-dimensional model of the welded object W. 3D CAD is a design model generated by CAD software in the design process. The design process is performed prior to the welding process. 3D CAD is stored in advance in the storage device 4. 3D CAD data includes information indicating a position of a welded portion of the welded object W. In the present embodiment, the position of the welded portion included in 3D CAD is referred to as a reference position of the welded portion. The storage device 4 is, for example, a Hard Disc Drive (HDD). The acquisition unit 3 also acquires the reference position of the welded portion by acquiring 3D CAD data.

The display unit 6 displays the imaging controlled by the display control unit 7. The display control unit 7 acquires an image of the welded object W captured by the imaging device 5. The display control unit 7 virtually superimposes the reference position acquired by the acquisition unit 3 on the captured image as a reference position image, and displays the image on the display unit 6. The imaging device 5 captures an image of the welded object W in the real space. The display control unit 7 virtually superimposes the reference position of the welding position acquired by the acquisition unit 3 on the imaging as a reference position image, and displays it on the display unit 6. In the present embodiment, the reference position image is a circular image having a predetermined radius centered on the reference position. Details of the reference position image will be described later. In this way, a technique of virtually superimposing images such as 3D images on a captured image is called an AR. The registration of the superimposed images is performed by known AR techniques. Such techniques are, for example, marker-type AR or marker-less type AR. The marker type AR uses a patterned pattern or a QR code (registered trademark) set in advance as a marker. The marker type AR performs alignment by recognizing a marker. In the marker-less AR, feature points or feature lines being imaged are recognized. Thus, the marker-less AR performs alignment.

The distance calculation unit 8 calculates a distance between the welded portion in the real space displayed on the display unit 6 and the reference position of the welded portion in the real space. The distance is calculated by a known AR technique. Such techniques are, for example, Simultaneous Localization and Mapping (SLAM). In SLAM, a plurality of feature points being imaged are extracted, and the distance between the imaging device 5 and the feature point is measured. The coordinate space is set by determining the coordinates of each feature point based on the distance. By setting the coordinate space, the distance in the real space between any two points during imaging can be obtained. In the present embodiment, the distance between the welded portion being imaged and the reference position of the overlapped welded portion in the real space is calculated. That is, the calculated distance is the amount of deviation between the welded portion defined in the design drawing and the welded portion where welding is actually performed. Further, the distance calculation unit 8 may calculate a distance for each axis in the set coordinate space. Specifically, the distance calculation unit 8 may calculate a distance for each of any two axes selected from the X axis, the Y axis, and the Z axis. The distance calculated by the distance calculation unit 8 is stored in the result storage unit 9. The result storage unit 9 is, for example, a HDD.

A2. Inspection Method for Welded Portion

Figure 2:
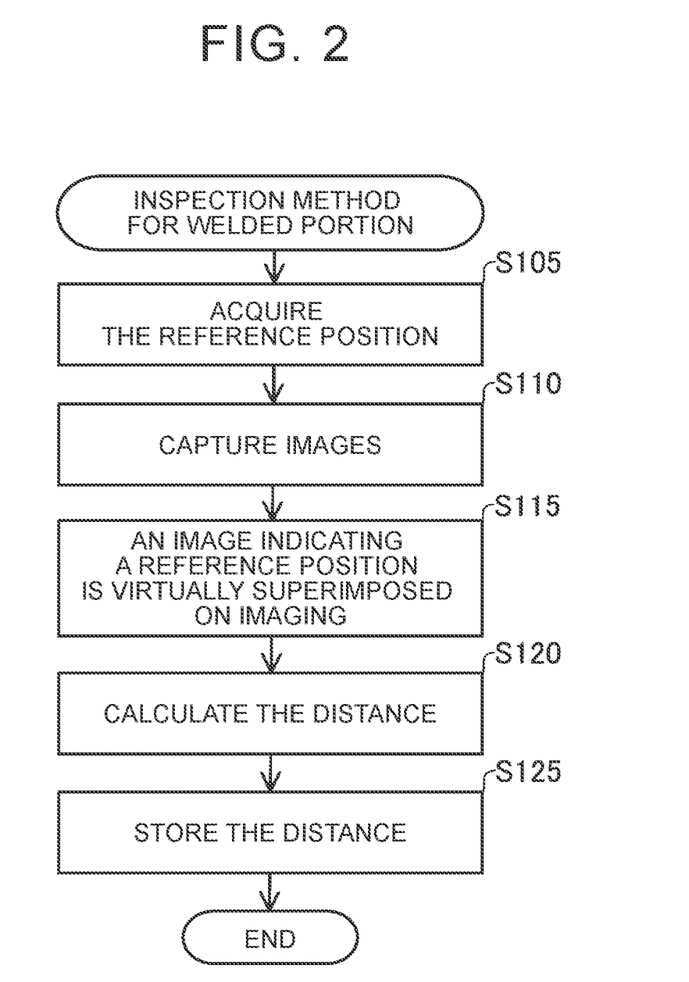
FIG. 2 is a flowchart illustrating a procedure of an inspection method for a welded portion performed using an inspection system.

FIG. 2 is a flowchart illustrating a procedure of an inspection method of a welded portion performed using the inspection system 100. The inspection method for the welded portion is performed after the welding process as a process of manufacturing the body of the automobile.

The acquisition unit 3 obtains the reference position of the welded portion (step S105). As described above, the acquisition unit 3 acquires the reference position of the welded portion from the storage device 4. When the storage device 4 stores 3D CAD of a plurality of types of welded objects W, the acquisition unit 3 recognizes feature points, feature lines, markers, or the like of the welded object W imaged by the imaging device 5. Thus, the acquisition unit 3 may specify the welded object W to be inspected and acquire the corresponding 3D CAD.

Figure 3:
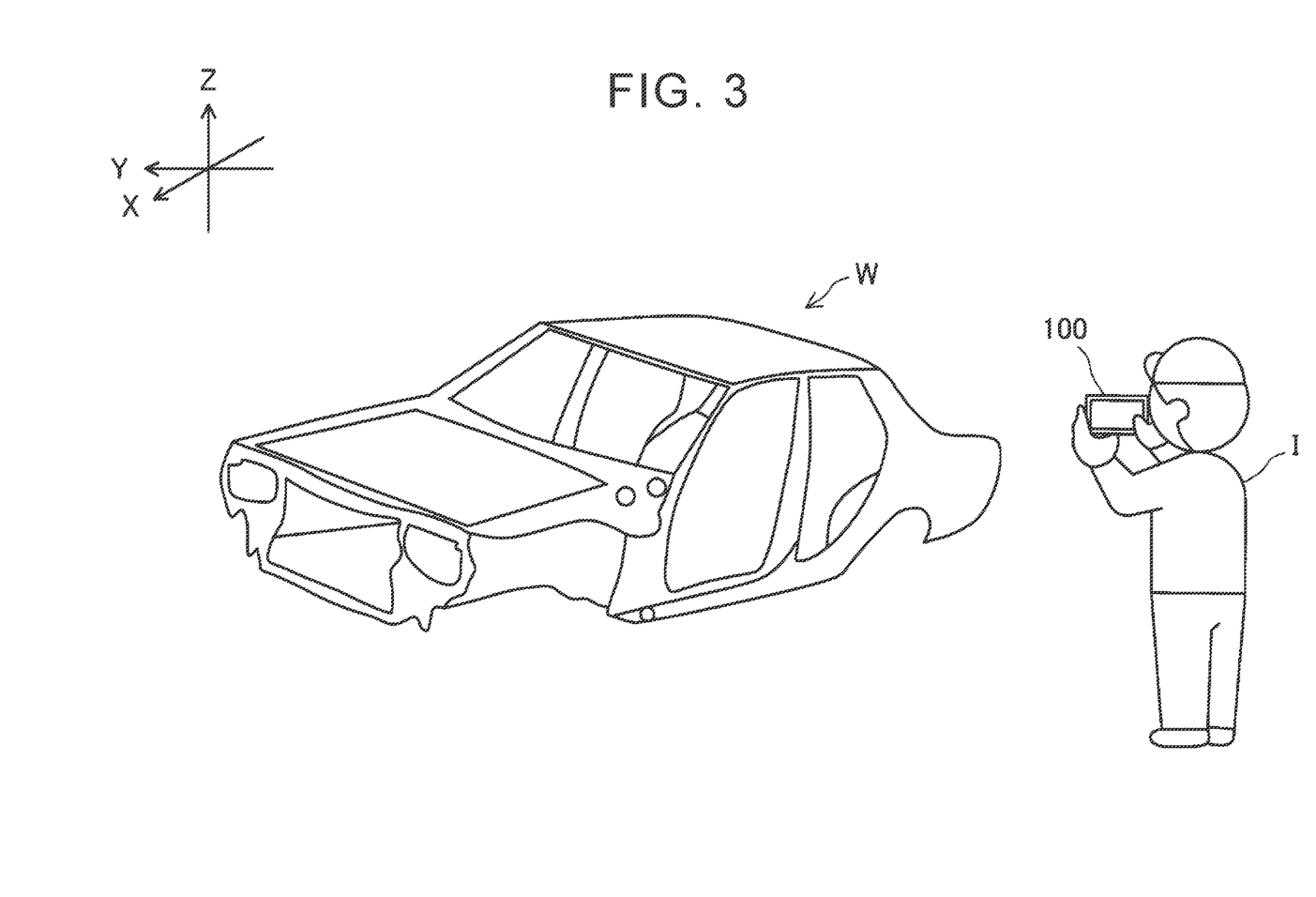
FIG. 3 is a diagram illustrating an example in which an inspector captures an image of an object to be welded using an inspection system.

The display control unit 7 acquires an image of the welded object W in the real space, the image including the welded portion (step S110). The imaging may be performed by the imaging device 5. Alternatively, the imaging may be stored in advance in the storage device 4. Hereinafter, a case where imaging is performed by the imaging device 5 will be described. FIG. 3 is a diagram illustrating an example in which the inspector I takes an image of the welded object W using the inspection system 100. The inspector I photographs the welded object W so as to include the welded portion. The captured image is acquired by the display control unit 7. When the storage device 4 stores a plurality of pieces of 3D CAD data as described above, the acquisition unit 3 may acquire the reference position by photographing the inspector I so as to include at least one of the feature point, the feature line, or the marker of the welded object W. Specifically, the acquisition unit 3 recognizes a feature point, a feature line, a marker, or the like of the welded object W included in the imaging. Thus, the acquisition unit 3 may specify the welded object W to be inspected and acquire 3D CAD including the reference position. That is, the steps of step S105 and step S110 may be performed in parallel.

The display control unit 7 virtually superimposes the reference position images indicating the reference positions of the welded portions on the images acquired in the step S110 (step S115). The display control unit 7 virtually superimposes the reference position image indicating the reference position on the image of the welded object W including the welded portion. The images to be superimposed can be aligned using the known AR techniques described above.

Figure 4:
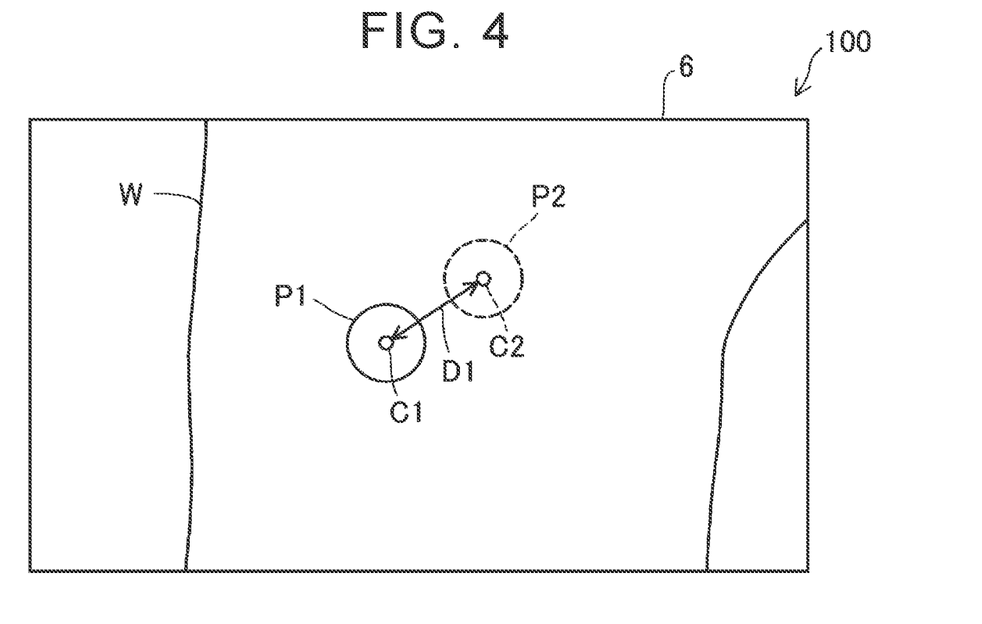
FIG. 4 is a diagram illustrating an example in which a reference position image is virtually superimposed on an image including a welded portion.

FIG. 4 is a diagram illustrating an exemplary virtual superimposition of reference position images P2 on imaging including welded portion P1. In the present embodiment, the welded portion P1 in the real space has a substantially circular shape and has a center C1. The virtually superimposed reference position images P2 have a substantially circular shape and have a center C2. In FIG. 4, the welded portion P1 and the reference position images P2 are located at deviated positions. That is, the welding is performed at a position deviated from the reference position defined in the design drawing.

The distance calculation unit 8 calculates a distance between the welded portion in the real space and the reference position of the welded portion in the real space (step S120). The distance calculation unit 8 uses, for example, a SLAM as described above. The distance calculation unit 8 calculates a distance in the real space between the welded portion P1 displayed on the display unit 6 and the reference position image P2. The calculated distance is a distance D1 between the center C1 of the welded portion P1 and the center C2 of the reference position image P2. That is, the calculated distance D1 is a deviation amount from the welded portion defined in the design drawing of the welded portion where welding is actually performed.

The result storage unit 9 stores the distance calculated by the distance calculation unit 8 (step S125). The result storage unit 9 stores the distance calculated by the distance calculation unit 8 as a shift amount of the welded portion PT.

According to the inspection system 100 described above, the reference position image is virtually superimposed on the imaging including the welded portion. Then, the inspection system 100 calculates the distance between the welded portion and the reference position of the welded portion in the real space. Therefore, in the post-welding inspection process, the inspection system 100 can measure the amount of deviation of the welded portion from the imaging including the welded portion and the information on the reference position of the welded portion. In addition, the inspection system 100 can inspect the welded portion in a simple and short time as compared with the manual inspection by the inspector I which has been conventionally performed.

Further, according to the inspection system 100, the reference position of the welded portion is superimposed on the imaging including the welded portion and displayed. Therefore, the inspector I can easily confirm the correspondence between the welded object W and the design drawing without depending on the skill of reading and interpreting 2D design drawing, and can inspect the welded portion. Furthermore, the time and cost required for the education of the inspection work by the inspector I can be reduced.

Further, according to the inspection system 100, the result storage unit 9 stores the distance calculated by the distance calculation unit 8 as a shift amount. Therefore, the inspection record can be stored in a paperless manner.

B. Second Embodiment

Figure 5:
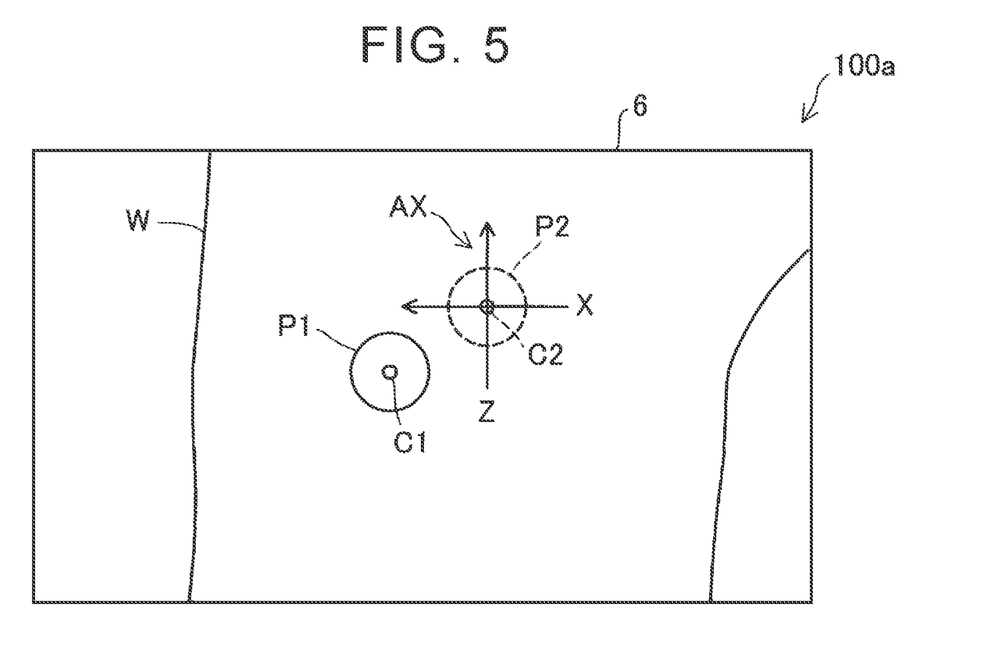
FIG. 5 is a diagram illustrating an example of a display unit of the inspection system according to the second embodiment.

FIG. 5 is a diagram illustrating an exemplary display unit 6 of the inspection system 100a according to the second embodiment. The inspection system 100a differs from the inspection system 100 of the first embodiment in that the display unit 6 further displays the coordinate axis AX. The coordinate axis AX includes a first axis along the first direction and a second axis along a second direction perpendicular to the first direction. The remaining configuration of the inspection system 100a of the second embodiment is the same as that of the inspection system 100 of the first embodiment. Therefore, the same components are denoted by the same reference numerals, and the description thereof will be omitted.

The first axis and the second axis are any different axes selected from the X axis, the Y axis, and the Z axis. The X-axis and the Z-axis in FIG. 3 both correspond to the X-axis and the Z-axis in FIG. 5. In FIG. 5, the X axis and the Z axis are perpendicular to each other in the center C2 of the reference position image P2. Note that the coordinate axis AX is not limited to the displays shown in FIG. 5. For example, the coordinate axis AX may be displayed at the upper right of the display unit 6. Alternatively, the coordinate axis AX may be displayed so as to be perpendicular to the center of the display unit 6. The first axis and the second axis displayed may be included in 3D CAD stored in the storage device 4. In this case, the acquisition unit 3 also acquires the first axis and the second axis when acquiring the reference position. Alternatively, the first axis and the second axis displayed may be arbitrarily selected and set by the inspector I.

According to the inspection system 100a of the second embodiment described above, since the coordinate axis AX is displayed on the display unit 6, the inspector I can confirm the orientation of the welded object W being imaged.

C. Third Embodiment

Figure 6:
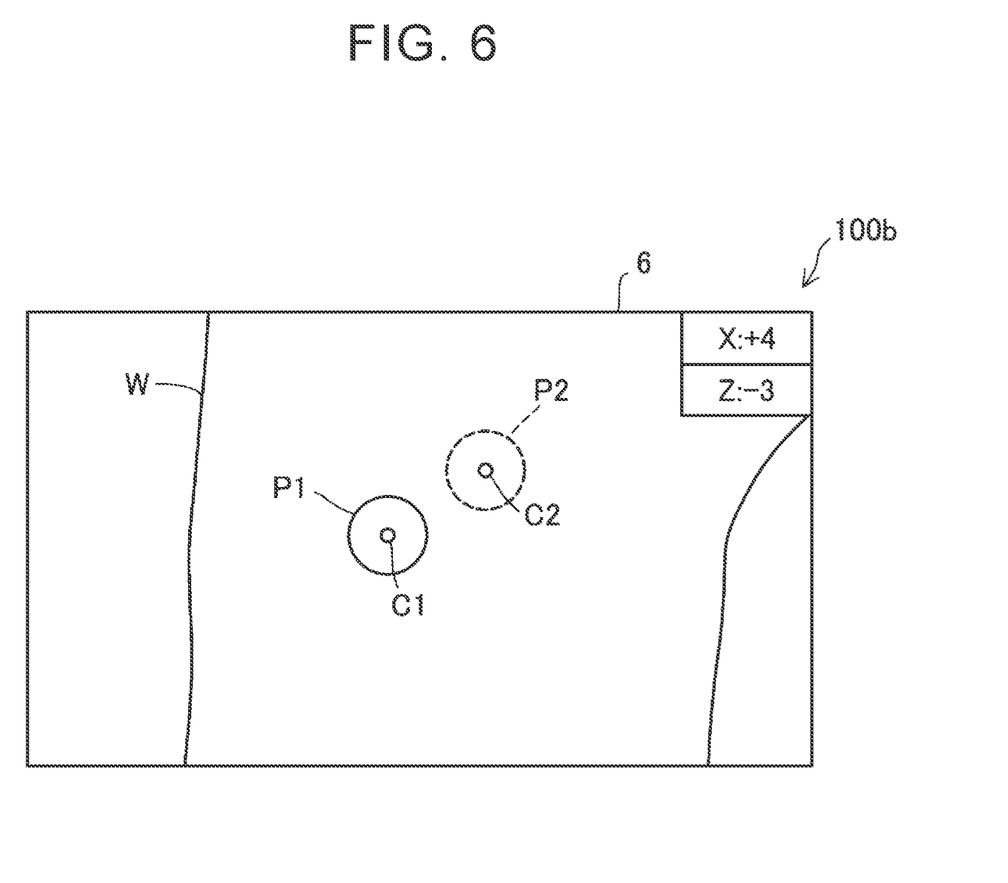
FIG. 6 is a diagram illustrating an example of a display unit of the inspection system according to the third embodiment.

FIG. 6 is a diagram illustrating an exemplary display unit 6 of the inspection system 100b according to the third embodiment. The inspection system 100b differs from the inspection system 100 of the first embodiment in that the display unit 6 displays a distance in the real space between the welded portion in the real space and the reference position of the welded portion. The remaining configuration of the inspection system 100b of the third embodiment is the same as that of the inspection system 100 of the first embodiment. Therefore, the same components are denoted by the same reference numerals, and the description thereof will be omitted.

The display control unit 7 displays the distance calculated by the distance calculation unit 8 on the display unit 6. In FIG. 6, the distance calculated by the distance calculation unit 8 is displayed on the upper right side of the display unit 6 for each axis. The designations "X: +4" and "Z: −3" indicate that the actually welded welded portion P1 is −3 cm shifted in the X-axis direction by +4 cm and Z-axis direction compared with the reference position of the welded portion. The distance D1 between the center C1 of the welded portion and the center C2 of the reference position may be displayed as well as the distance for each shaft. That is, in the exemplary embodiment of FIG. 6, the distance D1 may be displayed as 5 cm.

According to the inspection system 100b of the third embodiment described above, the distance between the welded portion in the real space and the reference position of the welded portion in the real space is displayed on the display unit 6. Therefore, the inspector I can immediately confirm the amount of deviation of the welded portion.

D. Fourth Embodiment

Figure 7:
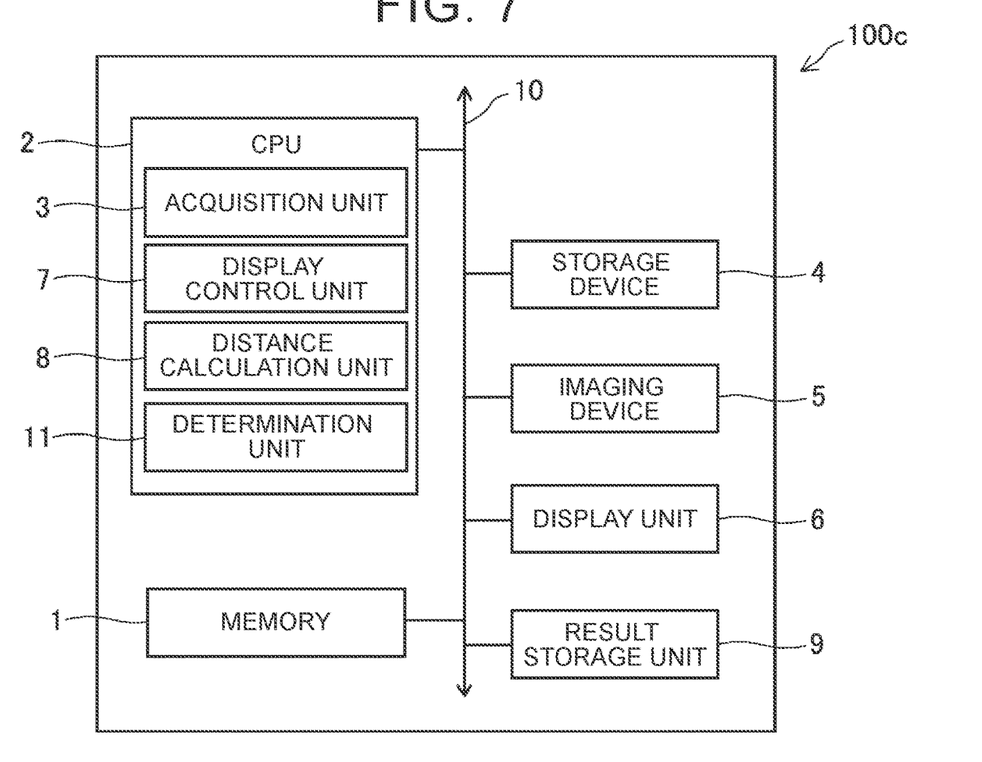
FIG. 7 is a block diagram schematically illustrating an inspection system according to a fourth embodiment.

FIG. 7 is a diagram schematically illustrating an inspection system 100c according to a fourth embodiment. The inspection system 100c of the fourth embodiment differs from the inspection system 100 of the first embodiment in that it further includes a determination unit 11. The determination unit 11 is a function realized by a CPU 2. The remaining configuration of the inspection system 100c of the fourth embodiment is the same as that of the inspection system 100 of the first embodiment. Therefore, the same components are denoted by the same reference numerals, and the description thereof will be omitted.

The determination unit 11 compares the distance between the welded portion in the real space and the reference position of the welded portion in the real space with the threshold value. The threshold value is an allowable upper limit value of the amount of deviation of the welded portion. The thresholds are preset and are, for example, 1 cm. The determination unit 11 determines the quality of the welding according to the comparison result. The result of the determination may be stored in the result storage unit 9.

Figure 8:
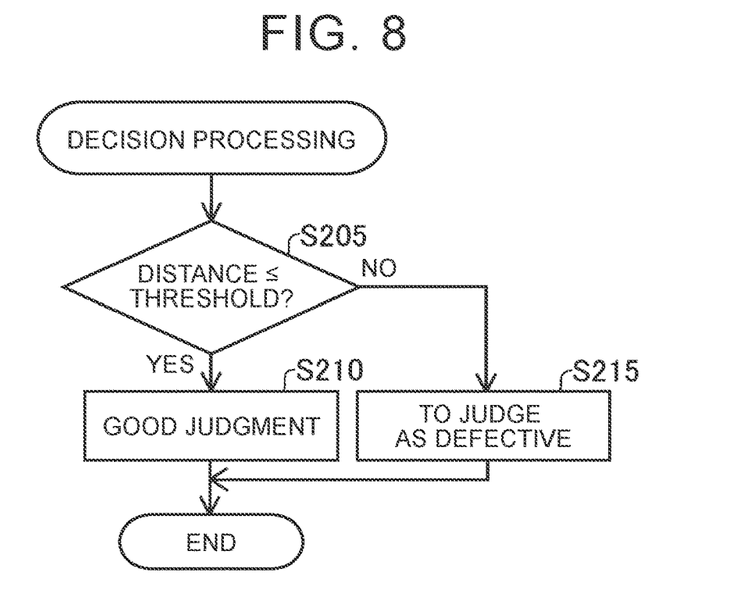
FIG. 8 is a flowchart illustrating a procedure of a welding determination process executed by the determination unit.

FIG. 8 is a flowchart illustrating a procedure of a welding determination process executed by the determination unit 11. The determination process is executed as a process of inspecting the welding. In the determination process, the determination unit 11 determines the quality of welding using the distance calculated by the distance calculation unit 8. The determination process may be performed after the step (S120) of calculating the distance of the welded portion inspection method described in the first embodiment.

The determination unit 11 determines whether or not the distance between the welded portion in the real space and the reference position of the welded portion in the real space is within a predetermined threshold (step S205). The determination unit 11 compares the distance calculated by the distance calculation unit 8 with a threshold value set in advance. When the determination unit 11 determines that the distance is less than or equal to the threshold value (step S205: YES), the determination unit 11 determines that the welding is performed satisfactorily (step S210). On the other hand, when the determination unit 11 determines that the distance exceeds the threshold value (step S205: NO), the determination unit 11 determines that the weld is defective (step S215).

According to the inspection system 100c of the fourth embodiment described above, the determination unit 11 determines whether the welding is good or bad by comparing the displacement of the welded portion with the set thresholds. Therefore, in the welding inspection process, the inspection system 100c can easily determine the quality of the welding without depending on the skill of the inspector I, as compared with the case where the inspector I manually measures the displacement amount and determines the quality of the welding.

E. Fifth Embodiment

Figure 9:
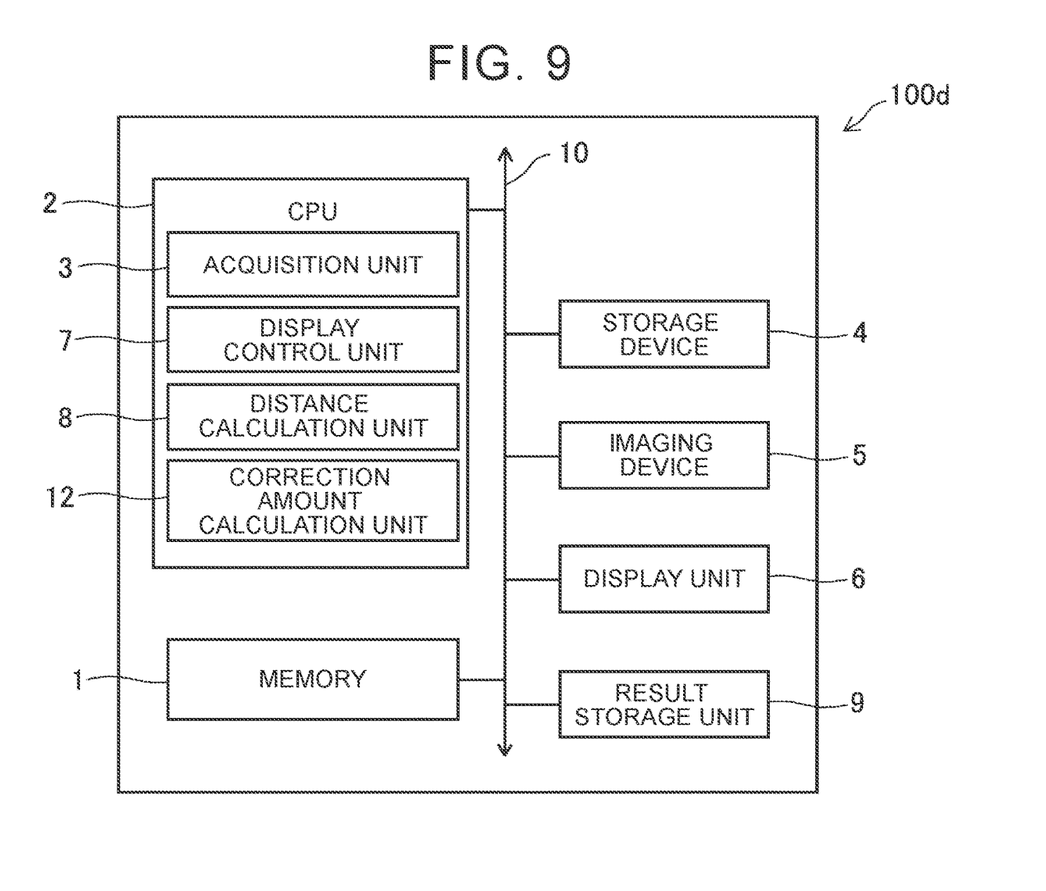
FIG. 9 is a block diagram schematically illustrating an inspection system according to a fifth embodiment.

FIG. 9 is a diagram schematically illustrating an inspection system 100d according to a fifth embodiment. The inspection system 100d according to the fifth embodiment differs from the inspection system 100 according to the first embodiment in that it further includes a correction amount calculation unit 12. The remaining configuration of the inspection system 100d of the fifth embodiment is the same as that of the inspection system 100 of the first embodiment. Therefore, the same components are denoted by the same reference numerals, and the description thereof will be omitted. The correction amount calculation unit 12 is a function realized by CPU 2. The correction amount calculation unit 12 calculates a correction amount of the distance necessary for re-welding the position of the welded portion in the real space at the reference position of the welded portion. For example, a case where the positional deviation calculated by the distance calculation unit 8 is +4 cm in the X-axis direction and −3 cm in the Z-axis direction will be described. At this time, in order to re-weld at the reference position, it is necessary to correct the distance obtained by reversing the positive and negative of each positional deviation. That is, −4 cm in the X-axis direction from the welded portion, by re-welding at the position of 3 cm in the Z-axis direction, it is possible to weld at a position coinciding with the welding reference position. Therefore, the correction amount calculation unit 12 performs the positive-negative reversal of the shift amount for each axis calculated by the distance calculation unit 8. The correction amount calculated by the correction amount calculation unit 12 may be displayed on the display unit 6 by the display control unit 7. At this time, the display control unit 7 may display, on the display unit 6, the distance calculated by the distance calculation unit 8 together with the correction amount. The correction amount may be stored in the result storage unit 9.

The inspection method for the welded portion described in the first embodiment may further include a step of the correction amount calculation unit 12 calculating the correction amount. In such cases, the step of calculating the correction amount is performed after the step of calculating the distance (step S120).

According to the inspection system 100d of the fifth embodiment described above, the correction amount calculation unit 12 is provided. Therefore, the inspector I confirms the correction amount calculated by the correction amount calculation unit 12, so that the inspector I can immediately understand the correction amount necessary for re-welding the welded portion.

F. Sixth Embodiment

Figure 10:
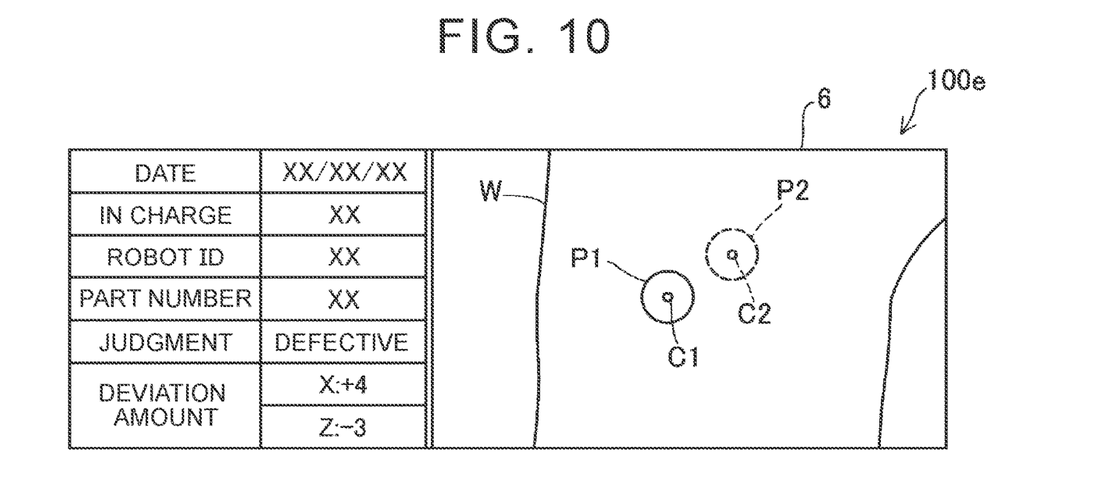
FIG. 10 is a diagram illustrating an example of a display unit of the inspection system according to the sixth embodiment.

The inspection system 100e according to the sixth embodiment differs from the inspection system 100 according to the first embodiment in that the display control unit 7 causes the display unit 6 to display the distance calculated by the distance calculation unit 8 and the result determined by the determination unit 11. The remaining configuration of the inspection system 100e of the sixth embodiment is the same as that of the inspection system 100 of the first embodiment. Therefore, the same components are denoted by the same reference numerals, and the description thereof will be omitted.

FIG. 10 is a diagram illustrating an exemplary display unit 6 of the inspection system 100e according to the sixth embodiment. As illustrated in FIG. 10, the display unit 6 displays the distance calculated by the distance calculation unit 8 and the determination result determined by the determination unit 11. The distance determined by the distance calculation unit 8 may be displayed for each axis. The determination result determined by the determination unit 11 is displayed as "good" on the display unit 6 when the welding is performed satisfactorily. The determination result determined by the determination unit 11 is displayed as "defective" on the display unit 6 when the welding is defective. In addition, the display unit 6 may display an image including an inspection portion of the welded object W. In FIG. 10, imaging is displayed on the right side as an example. Further, the display unit 6 may further display additional information such as the inspection date, the name of the inspector I in charge of the inspection process, ID of the welding robots in charge of the welding, and the product number of the welded object W. These additional information is stored in the storage device 4. The determination result and the additional information displayed by the display unit 6 may be stored in the result storage unit 9. In addition, the display unit 6 may display the correction amount calculated by the correction amount calculation unit 12 instead of the distance calculated by the distance calculation unit 8.

According to the inspection system 100e of the sixth embodiment, the display unit 6 displays the distance calculated by the distance calculation unit 8 and the determination result determined by the determination unit 11. Therefore, the inspector I can confirm at a glance the displacement amount of the welded portion and the quality of the welding. Further, it is also possible to collectively confirm additional information such as an image including a welded portion, an inspection date, a name of the inspector I, an ID of the welding robots, and a product number of the welded object W.

G. Seventh Embodiment

Figure 11:
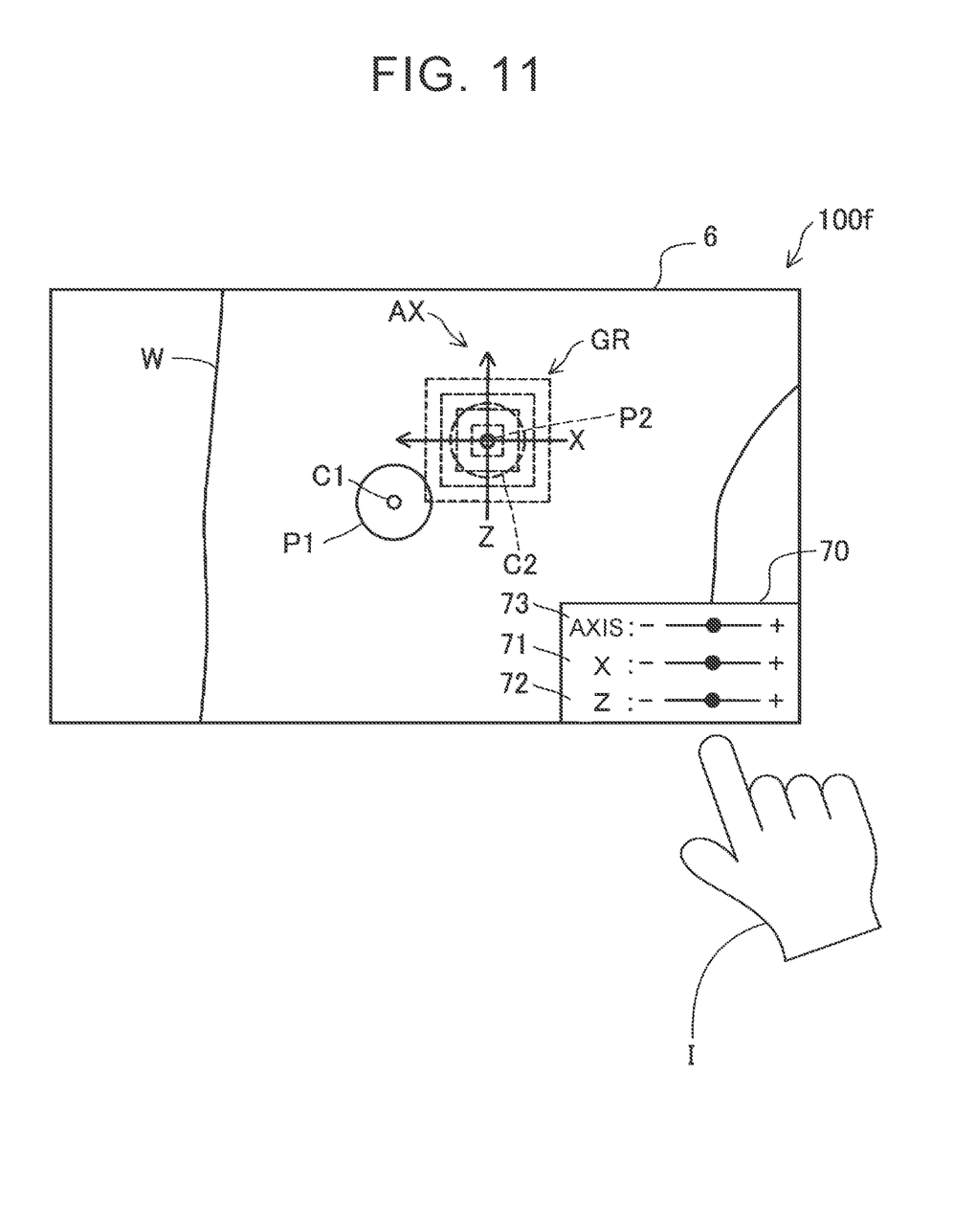
FIG. 11 is a diagram illustrating an example of an inspection system according to a seventh embodiment.

The inspection system 100f according to the seventh embodiment differs from the inspection system 100 according to the first embodiment in that it further comprises a user interface allowing the reference position image P2 to be moved on imaging. In addition, the inspection system 100 according to the first embodiment differs from the inspection system in that the distance calculation unit 8 calculates the distance by using the moving amount of the reference position image P2 when the reference position image P2 is moved so as to overlap with the welded portion in the imaging using the user interface. The remaining configuration of the inspection system 100f of the seventh embodiment is the same as that of the inspection system 100 of the first embodiment. Therefore, the same components are denoted by the same reference numerals, and the description thereof will be omitted.

FIG. 11 is a diagram illustrating an exemplary inspection system 100f according to a seventh embodiment. In the present embodiment, the display unit 6 is configured as a touch panel. As shown in FIG. 11, a slider 70 is displayed at the lower right of the display unit 6. The slider 70 includes a first slider 71, a second slider 72, and a third slider 73. The first slider 71 and the second slider 72 respectively correspond to two axial operations arbitrarily selected from the X axis, the Y axis, and the Z axis. The third slider 73 corresponds to the manipulation of the coordinate axis AX. The inspector I touches the first slider 71 or the second slider 72 and moves the reference position images P2 to the left and right, so that the reference position images can be moved in any direction on an axis-by-axis basis. The inspector I can rotate the coordinate axis AX in any direction by operating the third slider 73. The touch panel having such a configuration corresponds to a user interface that allows the reference position image P2 to be moved during imaging. In addition, a grid GR in which a plurality of squares having different lengths on one side are stacked is displayed on the display unit 6. The spacing between the squares of the grid GR is constant, for example 1 cm. The center of the grid GR overlaps the center C2 of the reference position image P2. The grids GR move at the same time as the reference position images P2 are moved. In the present embodiment, the inspector I operates the slider 70 to move the reference position images P2 so as to overlap with the welded portion P1. The overlapping of the reference position images P2 and the welded portion P1 means a broad conception including not only a case where the two are completely overlapped but also a case where a part thereof is overlapped. The inspector I may rotate the coordinate axis AX by operating the third slider 73 at the time of the moving so that the axis is aligned in any direction. In addition, the inspector I may operate the slider 70 while checking the distance using the grid GR at the time of the moving. When the reference position image P2 and the welded portion P1 overlap with each other due to the movement of the reference position image P2, the distance calculation unit 8 calculates the distance in the real space between the reference position image P2 and the welded portion P1 by using the movement amount of the reference position image P2. The distance is calculated by using a known AR technique such as SLAM as described in the first embodiment.

The inspection system 100*f* according to the seventh embodiment described above includes a user interface that allows the reference position image P2 to be moved during imaging. Further, in the inspection system 100*f*, the distance calculation unit 8 calculates the distance according to the moving amount of the reference position image P2. With such a configuration, as in the inspection system 100 described in the first embodiment, it is possible to easily inspect the welded portion. In addition, the inspector I directly operates through the user interface. Therefore, the inspector I can measure the distance between the welded portion and the reference position while visually checking. In addition, a grid GR is displayed. Therefore, the inspector I can measure the distance while checking the distance in the real space being imaged displayed on the display unit 6. In addition, the coordinate axis AX is rotatably displayed by the user interface. Therefore, the inspector I can measure the distance while aligning the axes.

H. Eighth Embodiment

Figure 12:
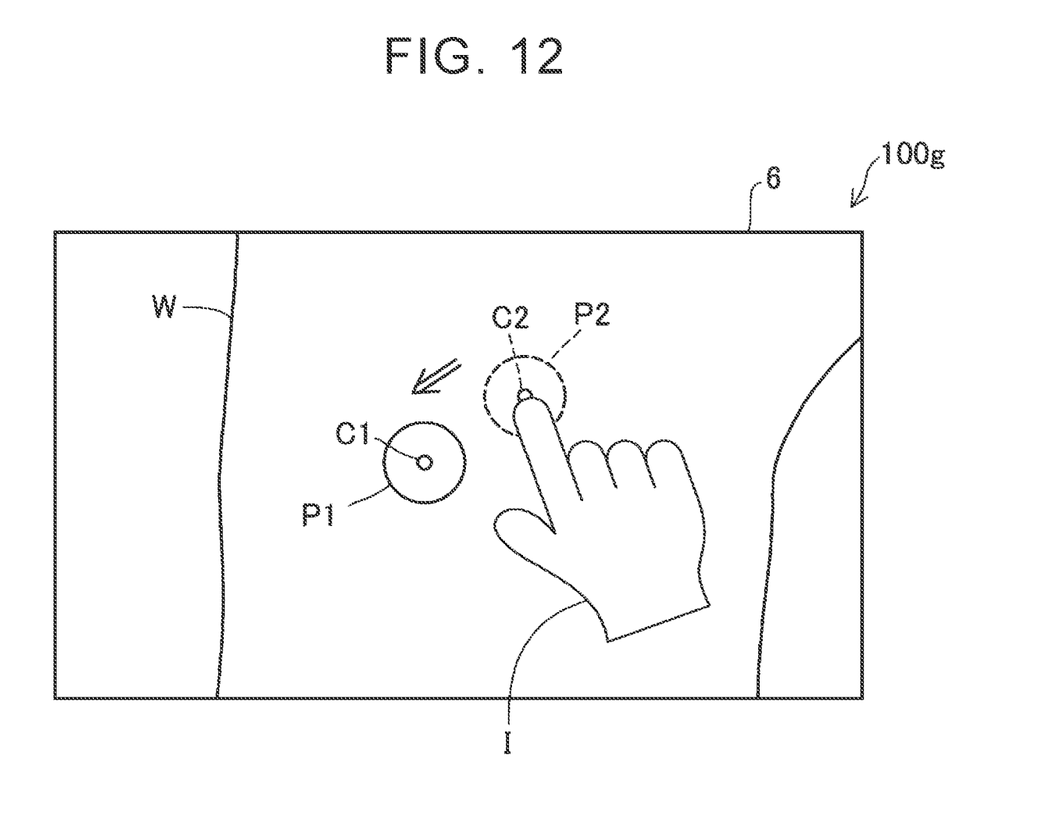
FIG. 12 is a diagram illustrating an example of an inspection system according to an eighth embodiment.

The inspection system 100*g* according to the eighth embodiment differs from the inspection system 100*f* according to the seventh embodiment in that the reference position image P2 is moved by touching the reference position image P2 displayed on the display unit 6.

FIG. 12 is a diagram illustrating an exemplary inspection system 100*g* according to an eighth embodiment. The reference position image P2 is configured to be movable on an image captured by the display unit 6. When the inspector I operates the touch panel, the reference position image P2 can be moved. Specifically, the inspector I can move the reference position image P2 to any position by touching and dragging the reference position image P2. As illustrated in FIG. 12, the inspector I moves the reference position image P2 so as to overlap with the welded portion P1 while touching the reference position image P2 with a finger. The distance calculation unit 8 calculates the distance in the real space between the reference position image P2 and the welded portion P1 by using the moving amount of the reference position image P2. Also in the inspection system 100*g*, the coordinate axis AX and the grid GR may be displayed as in the inspection system 100*f* of the seventh embodiment. In such cases, the coordinate axis AX is configured to be rotatable in any direction by operating the touch panel.

With the inspection system 100*g* according to the eighth embodiment described above, similarly to the inspection system 100*f* according to the seventh embodiment, the distance between the welded portion and the reference position can be calculated using the displacement of the reference position image P2.

I. Other Embodiments (I1) In each embodiment, the information stored in the result storage unit 9 may be stored in a storage device external to the inspection system 100. That is, the distance calculated by the distance calculation unit 8, the determination result determined by the determination unit 11, and the correction amount calculated by the correction amount calculation unit 12 may be stored in a storage device outside the inspection system 100. The external storage device is, for example, a server, a HDD, or the like. In such a case, the inspection system 100 may include a communication unit for communicating with an external server or the like. In such a case, the inspection system 100 may not have the result storage unit 9.

(I2) In each embodiment, the display unit 6 may display at least one of the distance calculated by the distance calculation unit 8, the determination result determined by the determination unit 11, and the correction amount calculated by the correction amount calculation unit 12. In addition, the display unit 6 may display two or more of these.

(I3) In each of the embodiments, the configuration in which the inspection system 100 includes the storage device 4 and the imaging device 5 has been described. However, instead of this configuration, the storage device 4 and the imaging device 5 may be provided outside the inspection system 100. That is, in the inspection system 100, the storage device 4 and the imaging device 5 are not essential components. In such a case, the inspection system 100 may include a communication unit for communicating with the external storage device 4 and the imaging device 5.

(I4) In the seventh embodiment, a configuration in which the user interface is a touch panel has been described. However, any user interface may be used instead of the touch panel. For example, the user interface may be a gesture interface operable by a gesture. The user interface may be a mouse or a keyboard.

The present disclosure is not limited to each of the above embodiments, and can be realized by various configurations without departing from the spirit thereof. For example, the technical features in the embodiments corresponding to the technical features in the embodiments described in SUMMARY can be appropriately replaced or combined in order to solve some or all of the above-described problems or to achieve some or all of the above-described effects. Further, when the technical features are not described as essential in the present specification, these can be deleted as appropriate.

What is claimed is:

1. An inspection system for a welded portion in welding, the inspection system comprising:
   a display;
   a processor, wherein the processor is configured to
      acquire a reference position of the welded portion stored in a storage device;

acquire an image of a welded object in a real space captured by an imaging device, the image captured including the welded portion;

virtually superimpose a reference position image on the image of the welded object and cause the display to display a superimposed image of the reference position image and the image of the welded object, the reference position image being an image indicating the reference position;

calculate a first distance in the real space between the welded portion in the real space displayed on the display and the reference position of the welded portion; and calculate a distance correction amount using the first distance, the distance correction amount being an amount of a second distance required for re-welding the welded portion in the real space at the reference position of the welded portion.

2. The inspection system according to claim 1, further comprising a result storage device that stores the first distance.

3. The inspection system according to claim 1, wherein the processor is further configured to cause the display to display a coordinate axis, the coordinate axis being a coordinate axis including a first axis extending along a first direction and a second axis extending along a second direction perpendicular to the first direction.

4. The inspection system according to claim 1, wherein the processor is further configured to determine whether welding of the welded portion in the real space is good using the first distance, wherein the determining of whether the welding of the welded portion in the real space is good includes determining that the welding is good when the first distance is within a predetermined threshold, and determining that the welding is poor when the first distance exceeds the predetermined threshold.

5. The inspection system according to claim 1, further comprising a user interface that allows the reference position image displayed on the display to be moved on the image of the welded object, wherein when the reference position image is moved so as to overlap the welded portion in the captured image using the user interface, the processor is configured to calculate the first distance using a movement amount of the reference position image.

* * * * *